United States Patent Office 2,777,763
Patented Jan. 15, 1957

2,777,763

METHOD OF PRODUCING TITANIUM

Thomas P. Whaley, Royal Oak, Mich., assignor to Ethyl Corporation, New York, N. Y., a corporation of Delaware No Drawing. Application September 14, 1955,
Serial No. 534,392

4 Claims. (Cl. 75—84)

This invention relates to manufacture of titanium and more particularly to a new and improved process for manufacture of high purity titanium metal from inexpensive raw materials and reagents.

Titanium is finding increased usage in the structural metals field, due chiefly to its high strength coupled with low specific gravity. Much intensive effort has been spent in the industry in recent years towards developing commercially feasible processes for the manufacture of this valuable product. None of the processes proposed to date is capable of producing titanium cheaply enough to open up the potentially large structural market.

Since titanium is found in nature in the form of its oxide, usually as rutile, $TiO_2$, or ilmenite, $FeTiO_3$, it is desirable to develop a process for the manufacture of titanium from these naturally occurring sources. One method that has been proposed for the production of titanium is reduction of the oxide with metallic calcium. Although this method is capable of producing a high quality product, provided the nitrogen content of the calcium reagent is sufficiently low, it has never achieved commercial success, due chiefly to the high cost of low nitrogen-calcium metal.

Another process which has been proposed for the production of numerous refractory metals, including zirconium, uranium, thorium and the like involves reducing their metallic oxides by the combined action of an alkali metal and an alkaline earth halide. In particular the reaction of zirconium dioxide with barium chloride and sodium is specifically described in the literature. This reaction when applied especially to titanium has not been found practical in that the product formed is of low purity and contaminated with a titanate of the alkaline earth metal. It has also been found that the calcium halides when reacted with the alkali metals in combination with reduction of the refractory oxide produces a product of higher metal content. Again however, this reaction results in the formation of calcium titanate as an impurity. The amount of titanate impurity formed is unpredictable as will be seen from the discussion hereinafter. It is desirable to overcome these disadvantages since the product obtained is not of sufficient purity for practical utilization. The titanate impurity is especially undesirable since no effective means of separation is now known which does not destroy a considerable portion of the desired product.

An object of the present invention is to provide a new and improved method for the preparation of metals, particularly titanium. A further object is to provide a new and improved process for the production of titanium from its oxide. Still a further object is to produce high purity titanium metal from naturally occurring raw materials. A specific object is to provide a new and improved process for the production of titanium by reduction of its oxide with calcium, the calcium being produced in situ from cheap and abundant starting materials. A still more specific object of the present invention is to provide a process of producing titanium by the combined action of a calcium halide and an alkali metal on a titanium oxide to result in high purity titanium essentially free of calcium titanate impurity.

The discovery has now been made that metallic titanium of high purity can be prepared by reacting titanium dioxide at elevated temperature with calcium halide and alkali metal, using for every mole of titanium dioxide at least 4 moles of calcium halide and at least 9.6 moles of alkali metal.

The process of the present invention can be thought of as taking place by means of the following equation:

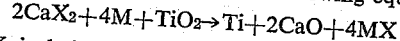

$$2CaX_2 + 4M + TiO_2 \rightarrow Ti + 2CaO + 4MX$$

where X is halogen and M is alkali metal. Stated in other words, the present invention comprises reducing titanium dioxide at elevated temperature by reduction with calcium halide and alkali metal in proportions such that the amount of calcium halide is at least 100 percent in excess in moles and the amount of alkali metal is at least 140 percent in excess in moles of the amounts required by the above equation. For the most beneficial results in terms of product purity it is preferable that the amount of alkali metal be at least 160 percent in excess in moles of the amount required by the equation.

In terms of the above equation, one preferred embodiment of the present invention comprises the reaction of titanium dioxide with at least 100 percent excess in moles of calcium chloride and with the weight ratio of calcium chloride to sodium being not greater than about 2 to 1.

It has been found that use of the cheap and abundant raw materials and reagents of the present invention consistently leads to the production of metallic titanium in purities of at least 90 percent metal content and generally above 95 percent metal content. In contrast, when operating with amounts of calcium halide and alkali metal less than the above-stated amounts, it is found that the purity of the product produced falls off sharply and titanate impurity is obtained.

The following examples will more completely illustrate the scope and benefits of my invention.

Example I

A mixture of titanium dioxide, calcium chloride, and sodium in ratio of 1 mole of titanium dioxide, 4 moles calcium chloride, and 9.6 moles sodium was heated in an electric furnace to a temperature of 800–900° C. for 30 minutes. The weight ratio of $CaCl_2$ to Na was therefore 2 to 1. In terms of the above equation, this represents a 100 percent excess of calcium chloride and 140 percent excess of sodium. At the end of this time the reaction mixture was permitted to cool, washed with alcohol to remove unreacted sodium, washed with dilute acid and water to remove soluble materials, and the residual product dried. This product was found to comprise titanium of 96.1 percent metal content. Further analysis of the titanium by X-ray diffraction showed only a very minor amount, on the order of 1 percent, calcium titanate impurity.

Example II

The procedure of Example I was repeated except that for every mole of titanium dioxide charged there was present 6 moles of calcium chloride and 14.3 moles of sodium. In terms of the above equation, this is a 200 percent excess of calcium chloride and a 260 percent excess of sodium. The product comprises titanium of 97.6 percent metal content. Analysis of the product by X-ray diffraction showed no calcium titanate.

Example III

The procedure of Example II was repeated except that the excess of calcium chloride according to the equation was 300 percent and the excess sodium was 356 percent. Titanium metal (96.6 percent by weight) was isolated from the run in good yield. No titanate impurity was found.

*Example IV*

The procedure of Example III was repeated with 100 percent excess calcium and 160 percent excess sodium. The product was 96.7 percent titanium having no calcium titanate as impurity.

In contrast, the following group of examples is presented to illustrate the poor quality products obtained when the relative amounts of the reagents are below those specified in the present invention.

*Example V*

The above procedure was repeated with a 100 percent excess of calcium chloride but only a 125 percent excess of sodium. The titanium metal content of the product was only 83.5 percent and contained 10 to 15 percent calcium titanate impurity.

*Example VI*

The procedure of Example V was repeated except that the excess calcium chloride was only 40 percent and the excess sodium was only 69 percent. The product comprised only 60 percent by weight of titanium. This product contained 40 percent of calcium titanate impurity.

*Example VII*

When the excess calcium chloride in the above example was cut down to 25 percent and the excess sodium was 41 percent, the metal product contained only 62 percent titanium.

*Example VIII*

Using a 20 percent excess calcium chloride and a 44 percent excess of sodium, the metal content of the product was only 60 percent. The product was contaminated with 40 percent calcium titanate.

It is to be noted from Examples VI and VIII that changing the excess of the calcium halide and sodium did not affect the quantity of calcium titanate impurity obtained thus demonstrating the unpredictability of the amount of this impurity which is formed.

The above examples illustrate the remarkable increase in product purity when the amount of calcium halide in product chosen is at least 4 moles per mole of titanium dioxide employed and when the amount of alkali metal used is at least 9.6 moles per mole titanium dioxide employed. The above examples also illustrate that according to the process of this invention the titanate problem is eliminated thus providing a more efficient and effective process for the production of titanium.

I have found that the temperatures at which the reactions of my invention should be carried out are not critical. Since it is preferred to have the calcium halide in molten state, I generally employ a temperature permitting the melting of the calcium halide. Although pure calcium chloride melts at about 770° C., it is possible by the use of melting point depressants to maintain a fluid mixture at much lower temperatures than this. For example, the alkali metal halide formed in the reaction serves to lower the melting point of the calcium chloride to around 700° C., and other diluents chosen to form binary and ternary mixtures can be used to lower the melting point even further. Calcium bromide and calcium iodide have melting points lower than that of calcium chloride, while that of calcium fluoride is higher. I have found that production of titanium at an efficient rate occurs at temperatures above about 700° C., and that for best results it is preferable to use temperatures in the range of about 800–900° C. However, if means to maintain the sodium in the reaction zone, such as pressure equipment or reflux condensers, are employed, temperatures higher than these can be used. In general, the temperature employed can very from about 700° C. to about 1000° C.

For best results it has been found that the reaction mixture should be maintained at reaction temperature for at least about 30 minutes and preferably from 1 to 4 hours. It is to be understood, however, that titanium is formed in even shorter periods of time at reaction temperature than this, although in lower yields.

It should be understood that the benefits of the present invention are obtained so long as the amounts of calcium halide and alkali metal are selected so as to be at least those amounts called for above. It is sometimes preferable to use amounts of both materials considerably in excess of the minimum amounts specified so that in effect an infinite excess of each of the reagents is present. Additional benefits to be obtained by such procedure include that of the use of the reagents as a flux. Thus, one can employ fluxing quantities of the reagents, that is more than about 400 mole percent. This is especially adaptable to continuous operation, but not limited thereto, in which the titanium dioxide is passed into a bath comprising the molten reagents and the titanium product continuously removed therefrom.

Many modifications and variations of the basic process of the above invention will be evident to those skilled in the art. For example, the alkali metal used in the reaction can be formed in situ from a mixture of alkali metal halide and calcium halide by electrolysis in the molten state. Titanium dioxide can then be added at or near the cathode of the cell while still maintaining a local excess of the calcium halide and alkali metal. Also, additional calcium metal can be added over and above the amount of calcium halide used. One elegant way of accomplishing this addition is to use the sodium-calcium sludge formed in electrolysis of sodium chloride-calcium chloride mixtures for the production of metallic sodium.

The titanium dioxide chosen should be free of absorbed moisture, and the calcium halide should be essentially anhydrous and free of any water of hydration. Both these materials should be of small particle size for best results.

For best results it is helpful to use efficient agitation in the reaction vessel. To achieve the advantages of this process the ingredients are intimately mixed. This can be done by mechanical stirring, plunging, use of ball-mill type equiment, and the like, either prior to or during the reaction period.

The process of my invention is adaptable to continuous operation. For example, an intimate mixture of anhydrous calcium chloride and titanium dioxide can be dispersed in molten sodium at 100–150° C. contained in a mixing vessel, the molten sodium being also continuously fed. The intimate mixture of sodium, calcium chloride, and the titanium dioxide is then fed continuously, as by a screw or belt conveyor, into a reactor maintained at temperatures on the order of 800–900° C., at which temperature reaction to form the titanium proceeds. The high temperature portion of the reaction zone is adapted for the residence time desired. From the reaction chamber the product mixture is led continuously to a still maintained at about 900° C. in which unreacted sodium is distilled from the mixture, condensed, and returned to the initial mixing chamber. The remainder of the mixture is cooled to a temperature below 100° C. and washed with dilute acid and water to remove all components except the titanium. The titanium is then dried and may be further purified.

In all modifications of the present invention it is important that the reaction be conducted in an atmosphere which is inert to the titanium. Since titanium reacts with oxygen, nitrogen and hydrogen, particularly at elevated temperatures, and since in many cases such reaction results in the formation of a brittle form of the titanium, it is preferred to use gases of the rare gas series, such as argon, helium, neon, etc., for the blanketing.

Although the present invention has been illustrated chiefly with calcium chloride and sodium, it is to be understood that other calcium halides and other alkali metals, such as lithium, potassium, cesium, and rubidium, are equally applicable. Mixtures of calcium halides and mixtures of alkali metals can be used. Similarly, although the discussion here has been confined to titanium, the process is equally applicable to the reduction of other refractory metal oxides especially the oxides of zirconium and thorium. Furthermore, it should be understood that mixed oxides of titanium, such as ilmenite, $FeTiO_3$, and mixed oxides of $TiO_2$ with alkaline earth oxides, such as calcium oxide, can also be used. In the case of mixed oxides the oxide with which the $TiO_2$ is mixed may or may not be reduced to the metal, depending upon the particular oxide involved. In any event the titanium product can be separated from residual mixtures by acid wash or other suitable means.

This application is a continuation-in-part of previously filed application Serial No. 382,010, filed September 23, 1953, now abandoned.

I claim:

1. A process for the preparation of titanium comprising reacting essentially anhydrous titanium dioxide at elevated temperature of at least about 700° C. for at least about 30 minutes with a molten anhydrous calcium halide and an alkali metal in proportions such that the amount of calcium halide is at least 100 percent in excess in moles and the amount of alkali metal is at least 140 percent in excess in moles of the amounts required by the equation $$2CaX_2 + 4M + TiO_2 \rightarrow Ti + 2CaO + 4MX$$

where X is halogen and M is alkali metal.

2. A process for the preparation of titanium comprising reacting essentially anhydrous titanium dioxide at a temperature between about 800° to 900° C. for a period of at least 30 minutes with at least 4 moles of anhydrous calcium chloride and at least 9.6 moles of sodium metal per mole of titanium dioxide starting material.

3. A process for the preparation of titanium comprising reacting essentially anhydrous titanium dioxide at a temperature between about 800° to 900° C. for a period of at least 30 minutes with essentially anhydrous calcium chloride and sodium metal in proportions such that the amount of calcium chloride is at least 100 percent in excess in moles and the amount of sodium metal is at least 160 percent in excess in moles of the amounts required by the equation $$2CaCl_2 + 4Na + TiO_2 \rightarrow Ti + 2CaO + 4NaCl$$

4. A process for the preparation of titanium comprising reacting essentially anhydrous titanium dioxide at a temperature of between about 800° to 900° C. for a period of at least 30 minutes with anhydrous calcium chloride and sodium, the proportion of calcium chloride being at least 100 percent in excess in moles of the amounts required by the equation $$2CaCl_2 + 4Na + TiO_2 \rightarrow Ti + 2CaO + 4NaCl$$

and the weight ratio of calcium chloride to sodium being not more than 2 to 1.

References Cited in the file of this patent

UNITED STATES PATENTS

| 1,573,083 | Marden et al. | Feb. 16, 1926 |
| 1,704,257 | Marden et al. | Mar. 5, 1929 |
| 2,546,320 | Rostron | Mar. 27, 1951 |

FOREIGN PATENTS

| 354,785 | Great Britain | Aug. 10, 1931 |

OTHER REFERENCES

Handbook of Chemistry and Physics, 26th ed., by Hodgman et al. Pub. 1942 by Chemical Rubber Publ. Co., Cleveland, Ohio. Pages 354–357, 362, 363, 398, 399, 426, 427, 440, and 441.